United States Patent

Biggs

[11] Patent Number: 5,886,682
[45] Date of Patent: Mar. 23, 1999

[54] METHOD AND APPARATUS FOR STRETCHING BITMAPS TO NON-INTEGER MULTIPLES

[75] Inventor: Kent E. Biggs, Tomball, Tex.

[73] Assignee: Compaq Computer Corporation, Houston, Tex.

[21] Appl. No.: 644,994

[22] Filed: May 14, 1996

Related U.S. Application Data

[63] Continuation of Ser. No. 243,158, May 16, 1994, abandoned.

[51] Int. Cl.$^6$ .................................................. G09G 5/00
[52] U.S. Cl. ........................ 345/127; 345/509; 382/298
[58] Field of Search .................................. 345/127–133, 345/185, 189, 190, 191, 200, 202, 203, 509, 515, 516, 517; 348/441, 445, 455, 456, 458; 358/451; 395/114, 139; 382/298–300

[56] References Cited

U.S. PATENT DOCUMENTS

| | | | |
|---|---|---|---|
| 4,631,751 | 12/1986 | Anderson et al. | 345/127 |
| 4,742,553 | 5/1988 | Irwin | 382/47 |
| 4,821,031 | 4/1989 | Roberts | 345/127 |
| 4,875,173 | 10/1989 | Nakajima | 345/127 |
| 5,113,455 | 5/1992 | Scott | 382/298 |
| 5,335,296 | 8/1994 | Larkin et al. | 345/127 |

FOREIGN PATENT DOCUMENTS

| | | |
|---|---|---|
| 0179553 | 4/1886 | European Pat. Off. . |
| 0137208 | 4/1985 | European Pat. Off. . |
| 0336776 | 10/1989 | European Pat. Off. . |
| 0497494 | 8/1992 | European Pat. Off. . |

*Primary Examiner*—Steven Saras
*Assistant Examiner*—Paul Bell
*Attorney, Agent, or Firm*—Vinson & Elkins L.L.P.

[57] ABSTRACT

The stretching of bitmap images in a computer system is accomplished by stretching each row of a source bitmap and storing the pixel information associated with the stretched row in a buffer, typically in main memory. The pixel information is transferred multiple times to the memory location associated with the destination bitmap, these memory locations generally reside in either main memory or in the frame buffer. Each time the buffer is written to the destination bitmap, an error term is adjusted by a predetermined amount. When the value of the error term meets a predefined criteria, the next row of the source bitmap is stretched and stored in the buffer and the process is repeated.

28 Claims, 4 Drawing Sheets

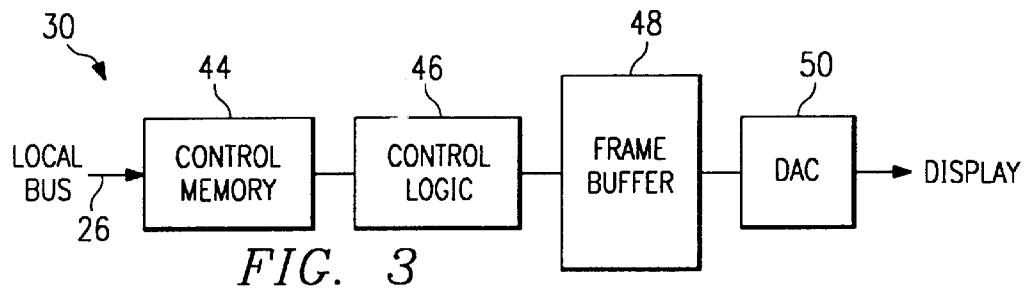
FIG. 3
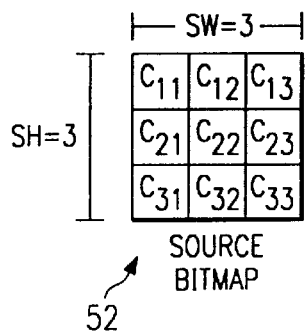
FIG. 4a
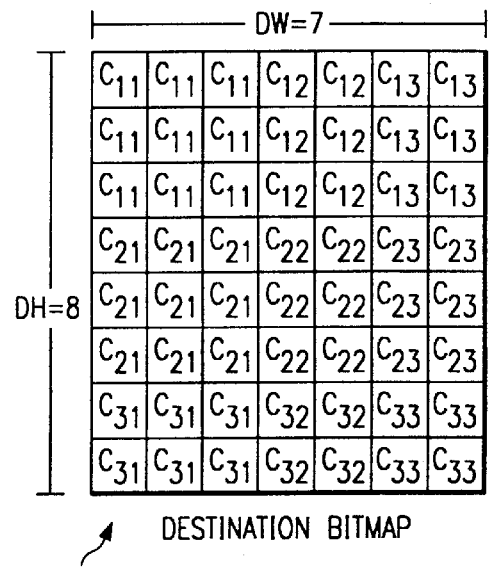
FIG. 4b
| ERRY | | DR | SR |
|---|---|---|---|
| 8 | | | |
| 5 | STRETCH SR=1 IN X AND COPY FROM BUFFER | 1 | 1 |
| 2 | REPEAT FROM BUFFER | 2 | |
| −1 | REPEAT FROM BUFFER | 3 | |
| +8(7) → 4 | STRETCH SR=2 IN X AND COPY FROM BUFFER | 4 | 2 |
| 1 | REPEAT FROM BUFFER | 5 | |
| −2 | REPEAT FROM BUFFER | 6 | |
| +8(6) → 3 | STRETCH SR=3 IN X AND COPY FROM BUFFER | 7 | 3 |
| 0 | REPEAT FROM BUFFER | 8 | |
FIG. 6

METHOD AND APPARATUS FOR STRETCHING BITMAPS TO NON-INTEGER MULTIPLES

RELATED APPLICATIONS

This application is a continuation of application Ser. No. 08/243,158, filed May 16, 1994, and entitled, "Method and Apparatus for Stretching Bitmaps to Non-Integer Multiples," now abandoned.

TECHNICAL FIELD OF THE INVENTION

This invention relates in general to computers, and more particularly to a video graphics controller with the ability to stretch bitmapped images to non-integer multiples at high speeds.

BACKGROUND OF THE INVENTION

The speed at which a personal computer operates is dependent upon a number of factors. Naturally, the speed of the microprocessor has a significant influence on the speed of operation of the overall computer system. Next to processor speed, in many cases, the video graphics subsystem has the most influence on the performance of the overall computer system. This is particularly true when a graphical user interface, such as MICROSOFT WINDOWS (by Microsoft Corporation of Redmond, Wash.) is used. In order to boost performance, most modern day personal computers use either a local video bus (which has a higher data bandwidth than the main peripheral bus) and an accelerated video card which increases the speed of certain operations. An accelerated video card allows the video card to perform selected video operations at high speed, rather than using the CPU to perform the operation. This accelerates the operation of the computer system in two ways: (1) the CPU no longer needs to perform low-level operations handled by the video card and (2) the data bandwidth for certain operations is greatly reduced resulting in less bus traffic.

In order for acceleration to increase the responsiveness of the system, the operating environment, such as WINDOWS, must know the capabilities of the accelerated video subsystem. When the operating environment is loaded, it initiates the loading of a video driver, which is a program which acts as an intermediary between the operating environment and accelerated video subsystem. The driver passes parameters to the operating environment which specify its capabilities. Thereafter, when the operating environment needs to perform a video operation which could benefit from one of the accelerated capabilities, it passes the necessary data to the driver. The driver interprets the information from the operating environment, processes the information and passes data via the bus to the video subsystem. The video subsystem then performs the video operation by writing data to its frame buffer. As the market for accelerated video subsystems has matured, it has become apparent that the speed of the video subsystem is in large part dependent upon the operation of the video driver.

One video operation which can have a significant effect on the responsiveness of the computer system is a bitmap stretch. In a bit-mapped image (or "bitmap"), the color information for each pixel in the bitmap is represented in a corresponding portion of memory. In a bitmap stretch, the destination bitmap is sized to dimensions greater than the source bitmap. Because of the complications of resizing a bitmap, most display device drivers only support bitmap stretching when the size of the destination bitmap is an integer stretch of the source bitmap. This technique is shown in FIGS. 1a–c. In FIG. 1a, the original bitmap 10 consists of nine pixels 12 arranged in a 3×3 array. For illustration purposes, each pixel has an associated index (1–9) which indicates the color of the pixel. The resulting destination bitmap 14 after performing a 2:1 stretch of the source bitmap 10 is shown in FIG. 1b. In FIG. 1b, each pixel 12 has been replicated twice in both the vertical and horizontal directions, resulting in a 6×6 array. As can be seen, each pixel from the bitmap of FIG. 1a is now a 2×2 array in FIG. 1b.

Similarly, in FIG. 1c, a destination bitmap 16 resulting from a 3:1 stretch of the source bitmap 10 of FIG. 1a is illustrated. In FIG. 1c, each pixel 12 of bitmap 10 of FIG. 1a is replicated in FIG. 1c as a 3×3 array. The resulting bitmap 16 is therefore a 9×9 array.

With an integer-multiple stretch of a bitmap array, the video operations are very simple, since each pixel is replicated by the integer multiple in both the "x" and "y" directions. However, with non-integer multiples, stretching becomes much more complex. For example, stretching the 3×3 bitmap of FIG. 1a to a 7×8 bitmap requires that decisions are made as to the number of times to replicate each pixel. Because of the complication of providing a non-integer multiple, most display device drivers only support integer stretching.

Therefore, a need has arisen in the industry for a video driver capable of supporting high-speed non-integer stretching of bitmapped images.

SUMMARY OF THE INVENTION

In the present invention, the non-integer multiple stretching of bitmap images in a computer system is accomplished by stretching each row of a source bitmap and storing the pixel information associated with the stretched row in a memory buffer. The pixel information is transferred multiple times to the memory locations associated with the destination bitmap, each transfer resulting in a generation of a row of the destination bitmap. Each time the buffer is written to the destination bitmap, an error term is adjusted by a predetermined amount. When the value of the error term meets a predefined criteria, the next row of the source bitmap is stretched and stored in the buffer and the process is repeated.

The present invention provides significant advantages over the prior art. Because the destination row data is stored in a buffer, multiple destination rows can be generated using only minor calculations. Therefore, the destination bitmap can be formed at high speeds, using minimal processor time.

BRIEF DESCRIPTION OF THE DRAWINGS

For a more complete understanding of the present invention, and the advantages thereof, reference is now made to the following descriptions taken in conjunction with the accompanying drawings, in which:

FIG. 3 illustrates a simplified block diagram of a video controller;

FIGS. 4a–b illustrate the stretching of a source bitmap to a non-integer multiple;

FIG. 6 illustrates the formation of rows in the destination buffer;

DETAILED DESCRIPTION OF THE INVENTION

The preferred embodiment of the present invention and its advantages are best understood by referring to FIGS. 2–10 of the drawings, like numerals being used for like and corresponding parts of the various drawings.

Figure 1A:
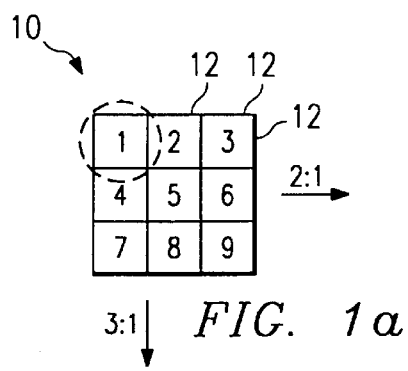
FIGS. 1a–c illustrates stretching a source bitmap to integer multiples.
Figure 1B:
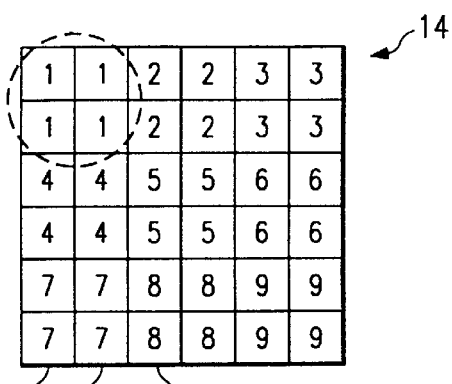
Figure 1C:
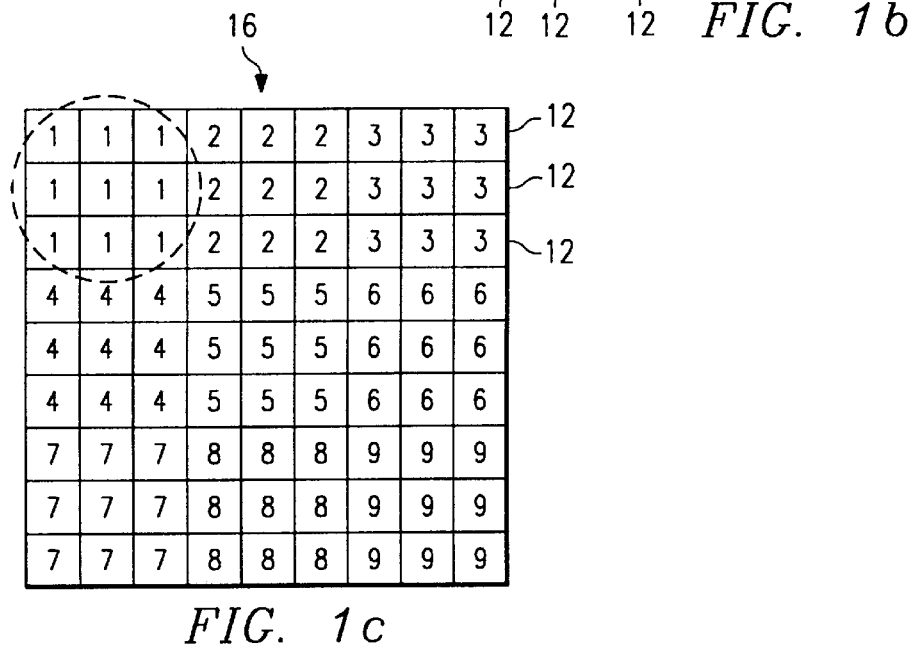
Figure 2:
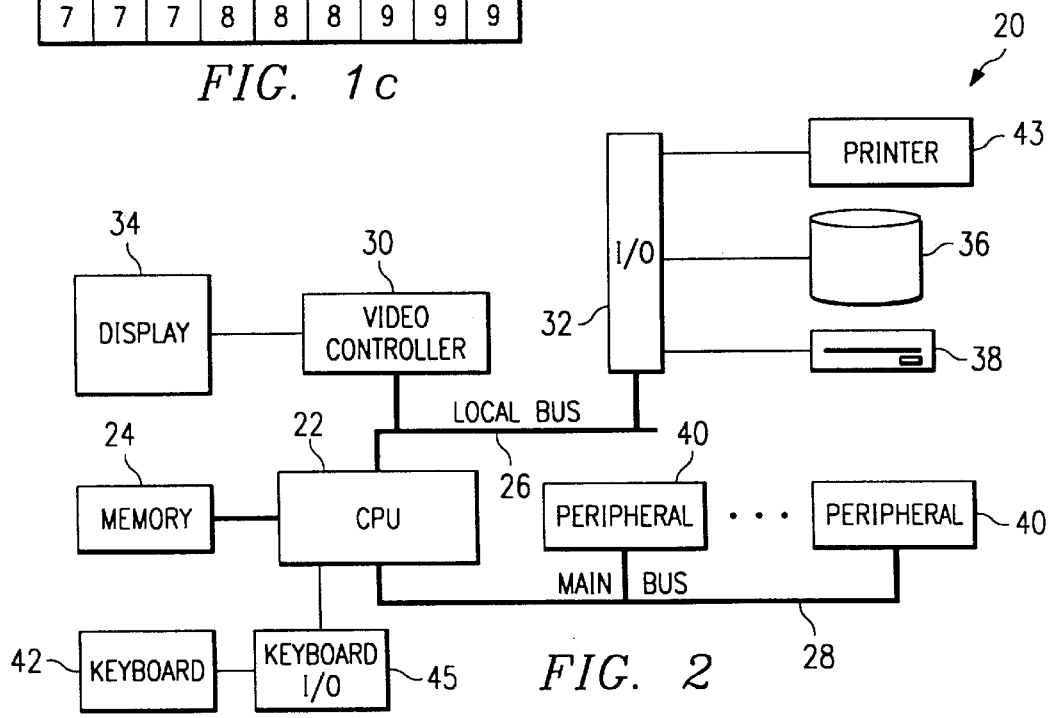
FIG. 2 illustrates a simplified block diagram of a computer system.

FIG. 2 illustrates a block diagram of a computer system 20. The computer system 20 includes a microprocessor (or central processing unit) 22, coupled to memory 24, a local bus 26 and a main peripheral bus 28. A video controller 30 and I/O circuitry 32 are coupled to the local bus 26. A display 34 is coupled to the video controller 30. A hard disk 36 and floppy disk 38 are coupled to the I/O circuitry 32. A plurality of peripherals 40 are coupled to the main bus 28. A keyboard 42 is coupled to the CPU 22 through keyboard interface 45. A printer 43 is also coupled to I/O circuitry 32. The computer system 20 of FIG. 2 is an exemplary embodiment for a high performance computer system. Many computer systems vary from the architecture shown in FIG. 2, and the invention described herein would apply to various architectures. Further, the architecture shown in FIG. 2 is a basic architecture and many of the details have been removed for illustrative purposes.

FIG. 3 illustrates a more detailed block diagram of the video controller 30. The video controller 30 comprises a memory section 44, including control registers and buffers, a state machine 46 coupled to the memory section 44 and a frame buffer 48. The frame buffer 48 is connected to a digital-to-analog converter (DAC) 50 which outputs video information to the display 34 responsive to the data stored in frame buffer.

The video driver is loaded into the computer system 20 at runtime along with the operating environment, such as WINDOWS. In operation, the video driver, responsive to instructions from the operating environment, outputs data and control signals to the video controller 30. Responsive to the data and control signals, the state machine 46 controls the flow of data to and from the frame buffer 48.

FIGS. 4a–b illustrate the non-integer stretching of a bitmap. The source bitmap 52 is shown as a 3×3 array of pixels. Hence, the source width (SW) is three and the source height (SH) is three. Each pixel has an associated color listed in matrix form. Hence, the color of the pixel in the upper-left corner is shown as $C_{11}$ and the color in the lower-righthand pixel is shown as $C_{33}$. Using the method described hereinafter, the source bitmap 52 is transformed into the destination bitmap 54. The destination bitmap shown in FIG. 4b is a 7×8 bitmap, and hence, the destination bitmap has a width (DW) of seven and a height (DH) of eight. The corresponding colors from the source bitmap 52 are shown in the destination bitmap 54.

FIGS. 5–8 illustrate the method used for stretching a source bitmap to a destination bitmap. In the preferred embodiment, the method illustrated in FIGS. 5–8 is performed by the device driver, which is stored in the memory 24 of the computer system 20 and executed by the CPU 22. It would be possible to apportion some of the steps to the video controller 30 for executed by the state machine 46.

Figure 5:
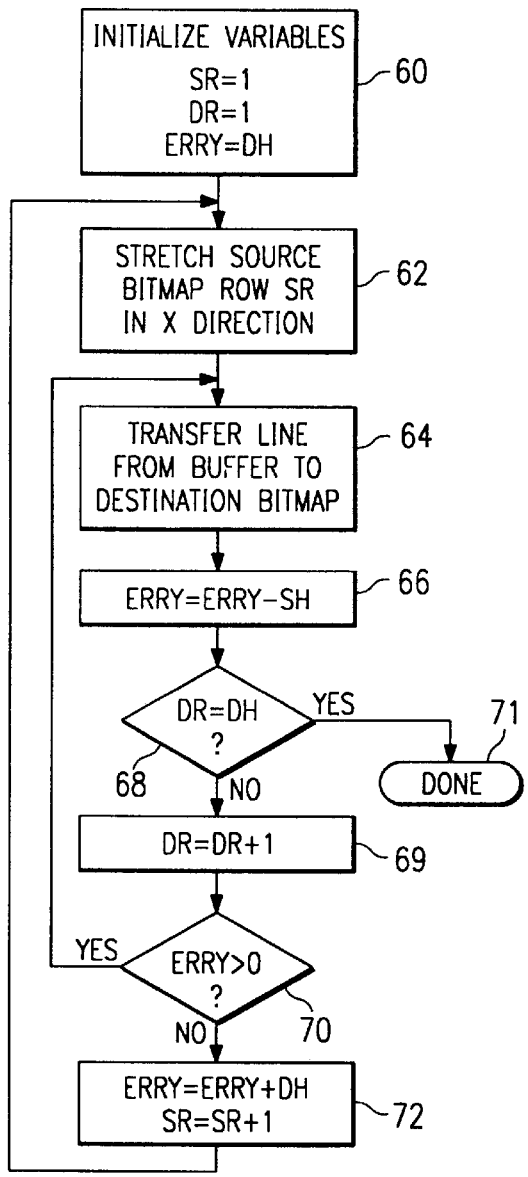
FIG. 5 illustrates a flowchart describing the general case method for stretching bitmaps to non-integer multiples.

FIG. 5 illustrates a flow diagram showing the general operation of the preferred embodiment of the technique for stretching bitmaps in the device driver. In block 60, the source row (SR) and destination row (DR) are initialized to "1", i.e., SR and DR point to the first rows of the source bitmap and destination bitmap, respectively. An error term for the Y direction (ERRY) is set to equal the destination height (DH). Hence, in the example shown in FIGS. 4a–b, ERRY is set to equal "8". In block 62, the row of pixels associated with SR are stretched in the X direction and stored to a buffer maintained in main memory 24. The details of stretching a row in the X direction is explained in connection with FIG. 7. The transformation described in block 62 is shown as the line labeled StretchX in FIGS. 4a–b. In this instance, the row comprising pixels $C_{11}$, $C_{12}$ and $C_{13}$ are stretched to a seven-pixel row comprising $C_{11}$, $C_{11}$, $C_{11}$, $C_{12}$, $C_{12}$, $C_{13}$, and $C_{13}$. In block 64, the pixels of the line stored in the buffer in block 62 are transferred to the desired destination location. The destination maybe the main memory 24 or frame buffer 48. The destination for the pixel data stored in the buffer is dependent upon locations for the start of the destination bitmap and the current destination row (DR). In block 66, the error term ERRY is updated by subtracting the source height (SH) from ERRY. Hence, if ERRY was initially set to eight, it would be reduced to five after the transfer of the first stretched bitmapped row. In decision block 68, DR is compared to DH to determine whether the last row has been transferred to the destination. If so, the bitmap stretching operation is finished in block 71. If the destination bitmap is not finished, program flow continues to decision blocks 69–70 where DR is incremented by "1" and the error term ERRY is checked to determine whether it is greater than "0". If ERRY >0, then program control returns to block 64 where the pixel data in the buffer is again transferred to the destination as updated by the incremented DR. If ERRY ≦0, then SR is incremented by "1" in block 72 and ERRY is incremented by DH. Program flow returns to block 62 where the next row is stretched in the X direction and stored to the buffer.

FIG. 6 graphically illustrates the construction of the destination bitmap. ERRY is initially set to "8", the destination height. Destination row "1" is generated from stretching the pixels in the first source row of the source bitmap, which are stored in the memory buffer and then transferred to the destination bitmap at row "1". ERRY is updated by subtracting SH from the current value of ERRY. Since ERRY now equals "5" (and therefore is greater than the threshold of "0"), the second destination row is identical to the first destination row; hence, the pixel information in the memory buffer is transferred to the memory locations in the destination corresponding to the second destination row. ERRY is updated so that it is now equal to "2". Since ERRY is still greater than "0", destination row "3" is again generated by transferring the pixel information from the memory buffer to the appropriate destination memory locations corresponding to destination row "3". After subtracting the source height from ERRY, a "−1" results; therefore, the destination height DH is added to ERRY and SR is incremented to point to the next source row. Hence, destination row "4" is generated by performing the stretch operation of block 62 on the second source row and transferring the new pixel information from the memory buffer to the memory locations associated with destination row "4". Destination rows "5" and "6" are generated by transferring the same pixel information from the memory buffer. After transfer of the pixel information for destination row "6", ERRY=−2 and therefore, the destination height is added to ERRY and the source row is incremented to point to the third row of the source bitmap. Destination row 7 is created by stretching the pixel information of the third source row in the X direction and transferring the new pixel information to the memory locations associated with destination row 7. Destination row 8 is created by transferring the pixel information from the memory buffer to the memory locations associated with destination row 8. At this point, DR=DH and the destination bitmap is complete.

It should be noted that it is possible for ERRY to equal "0" during generated of the destination bitmap, prior to completion (ERRY always equals "0" after the last row is generated). In the flow chart shown in FIG. 5, the decision to increment the next source row is made on the condition ERRY>0; it would also be appropriate to make the decision based on the condition ERRY≧0.

Figure 7:
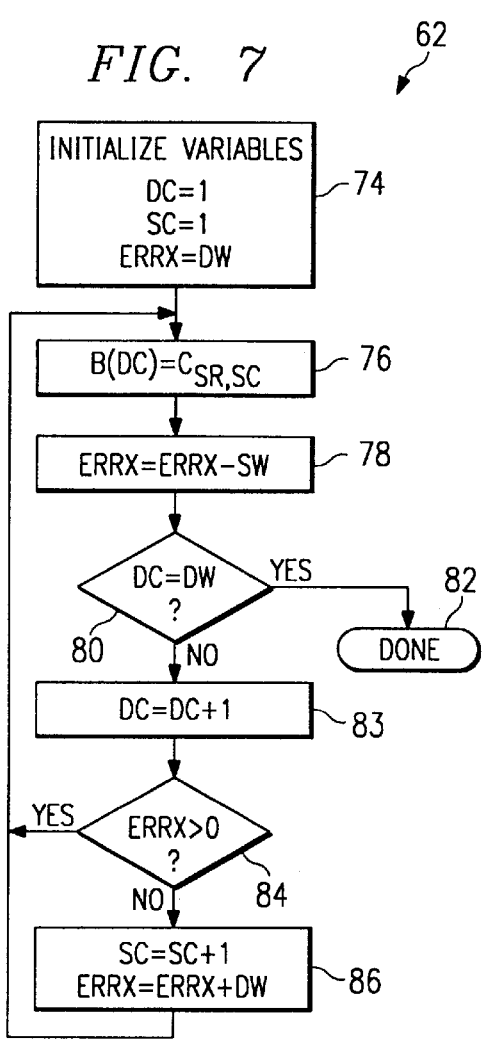
FIG. 7 illustrates a flow chart describing the general case method for stretching a source bitmap row of pixels to the dimension of the destination row.
Figure 8:
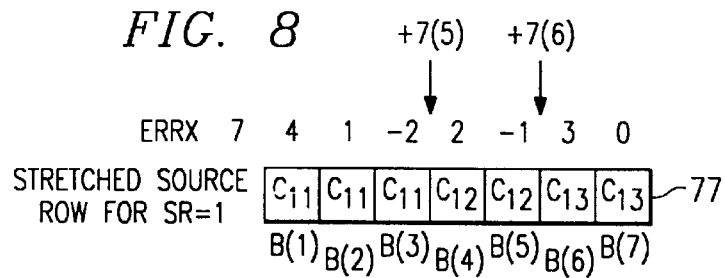
FIG. 8 illustrates a example of a stretched row as stored in the buffer.

The stretching step 62 is shown in greater detail in connection with FIGS. 7 and 8. FIG. 7 is a flow chart illustrating the method used to stretch pixels of a row of the source bitmap into a buffer. In block 74, the destination column and source column are set to "1" and the error term in the X direction, ERRX, is set equal to the destination width (DW). Hence, in the example shown in FIGS. 4a–b, ERRX is set to "7". In block 76, the buffer location pointed to by variable DC is set equal to the pixel information located at row SR (provided by the flow chart of FIG. 5) and column SC. Hence, in the first iteration for the first row of the source bitmap, B(1)=$C_{11}$, where B(X) is the Xth location in the buffer 77 for storing a destination row of pixel information, as shown in FIG. 8. In block 78, the error term ERRX is reduced by SW. In decision block 80, the condition DC=DW is checked to determine whether a complete destination row has been formed. If so, the subroutine is finished in block 82 and control returns the flow chart of FIG. 5 at block 64. If DC≠DW, then DC is incremented in block 83. In decision block 84, the error term ERRX is compared to "0". If ERRX>0, program control returns to block 76 where the next location in the buffer is set to the same value as the previous pixel in the buffer. If ERRX≦"0", then DW is added to ERRX and SC is incremented by "1" in block 86. Program control flows to block 76 where the next location in the buffer is set equal to the next pixel in the source row being stretched.

The results of the steps shown in the flow chart of FIG. 7 is shown in FIG. 8 for the first row of the source bitmap shown in FIG. 4a. In the first iteration of steps 76 and 78, the first pixel in the first row of the source bitmap is transferred to the first buffer location. After decrementing ERRX by SW in block 78, ERRX is still positive, hence, $C_{11}$ is also transferred to the second location in the buffer, B(2). Since ERRX is set to "1" after the second iteration, $C_{11}$ is also transferred to B(3). At this point, ERRX is decremented to "−2"; hence, DW (equal to "7") is added to ERRX and SC is incremented to point to the next pixel location ($C_{12}$). $C_{12}$ is therefore stored to the fourth buffer location. At this point (after subtracting SW), ERRX=2, and hence, $C_{12}$ is also stored in the fifth buffer location. After storing $C_{12}$ in the fifth buffer location, ERRX is updated to "−1"; therefore, ERRX is incremented by "7" and $C_{13}$ is stored to B(6). Since ERRX is equal to "3" at this point, $C_{13}$ is also stored to B(7), which is the last location in the buffer. This completes the subroutine for stretching pixels in the X direction. This information in buffer 77 is then duplicated one or more times in the Y direction until ERRY is no longer greater than "0" as described in FIG. 5.

By duplicating the buffer contents multiple times, a high speed stretch may be performed, suitable for video rates of 30 frames per second on a MPC2 (Multimedia Personal Computer specification, version 2) machine. The method can be enhanced in speed by using the video card, rather than the driver, to write the row buffer multiple times to the frame buffer at the same time that the next row buffer is computed by the driver.

Figure 9A:
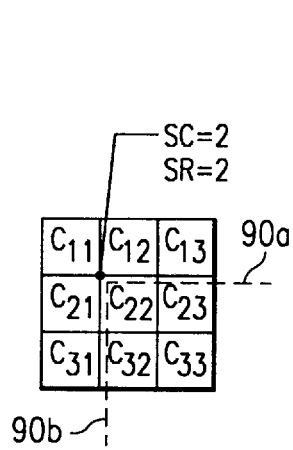
FIGS. 9a–b and 10a–b illustrate the stretching of clipped source bitmaps to full or clipped destination bitmaps.
Figure 9B:
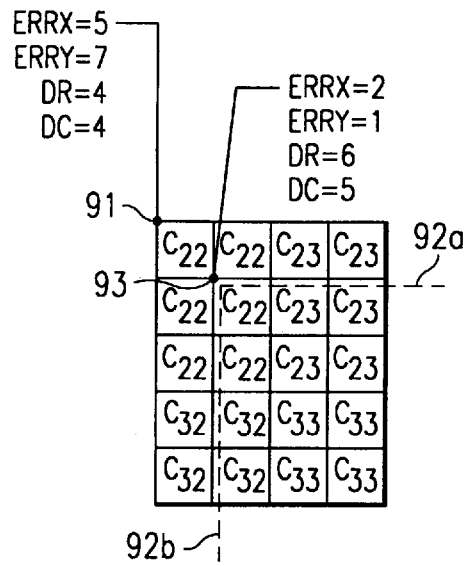

FIGS. 9a–b and 10a–b illustrate a modification of the general method shown in FIGS. 5–8 when a portion of the source and/or destination bitmaps are clipped due to windowing. In FIG. 9a, lines 90a–b are shown clipping the source bitmap to a two-by-two pixel array in the bottom-right hand corner. In order to compute the destination bitmap corresponding to the clipped pixels, the initial variables shown in blocks 60 and 74 of FIGS. 5 and 7, respectively, are modified. By substituting ERRX=5, ERRY=7, SR=2, SC=2, DR=4 and DC=4 (DH=8, DH=7, SH=3 and SW=3 remain the same, as in the general case), the bitmap shown in FIG. 9b is generated. The modified initial variable values correspond to the values at the corner of the destination bitmap at 91.

In FIG. 9b, clipping lines 92a–b are shown for the destination bitmap. If less than all of the destination bitmap is to be shown, the error values at the corner 93 of the clipped portion are used. Hence, ERRX=2, ERRY=1, DR=6, DC=5, SR=2 and SC=2 (the remaining variables remain the same as the general case). Consequently, only the destination pixels shown within lines 92a–b would be computed.

Figure 10A:
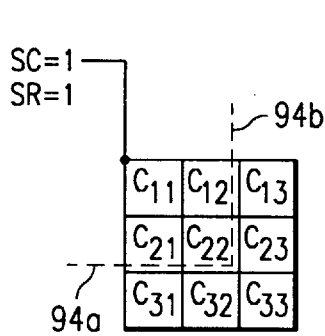
Figure 10B:
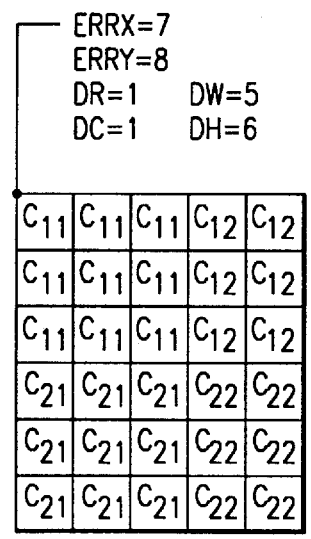

In FIG. 10a, clipping the source bitmap in the opposite corner, as shown by lines 94a–b, is illustrated. In this instance DH=6 and DW=5, the size of the destination bitmap. The remaining variables are set to the general-case values shown in FIGS. 5 and 7. The destination bitmap is shown in FIG. 10b.

While the present invention has been described in relation to stretching each row of the source bitmap in the X direction and transferring each stretched row to the destination bitmap one or more times, it would be equally effective to stretch each column of the source bitmap in the Y direction and transfer each stretched column to the destination bitmap multiple times. In other words, "row" has been arbitrarily shown as a horizontal line of pixels from left to right, but in operation, the "row" could be a vertical line of pixels as well.

Further, while the preferred embodiment has been illustrated as stretching the source bitmap rows starting from the top and moving sequentially downward, it would be clear to one skilled in the art that the stretching could proceed from top to bottom, bottom to top, left to right, or right to left. In fact, when the stretched bitmap has a destination which overlaps the source bitmap, it may be necessary to vary the direction of stretching to prevent overwriting pixel data which is part of a subsequent stretch.

When using the present invention in the WINDOWS operating environment, there are two procedures StretchBLT and StretchDIBits which are used to stretch bitmaps, the latter used to stretch device independent bitmaps. In the preferred embodiment, the method described above can be used to replace the default StretchBLT procedure. For the StretchDIBits procedure, the method is only used when the destination format is the same as the source format.

Another variation on the method described above would be to use interpolation on the colors at the transitions spots where pixels in row change from one color to another color. In some cases using a transition color, based on the colors of the surrounding pixels can create a image with smoother contours. While such interpolation can be used, it would require additional processing time and would be most effective when used with multiple buffers such that the colors from the preceding and subsequent rows can be used in the interpolation.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

What is claimed is:

1. A method of stretching a source bitmap having known row and column dimensions to a destination bitmap having row and column dimensions greater than the source bitmap comprising the steps of:

generating a row of pixel information for a destination row using pixel information from a source row;

storing said row of pixel information for the destination row in a buffer;

transferring said stored row of pixel information for the destination row from said buffer to a memory at locations corresponding to multiple destination rows of the destination bitmap, wherein a column error term is updated by a value dependent upon the dimension of a column of the source bitmap; and repeating said steps of generating, storing, and transferring until the destination bitmap is complete.

2. The method of claim 1 wherein said transferring step comprises the steps of:

moving said stored row of pixel information for the destination row from said buffer to said memory at addresses corresponding to a row of the destination bitmap; and repeating said moving step until said column error term is within a predetermined criteria.

3. The method of claim 2 wherein said moving step further includes the step of reducing said column error term by a predetermined amount.

4. The method of claim 3 wherein said moving step further includes the step of reducing said column error term by a value dependent upon the dimension of a column of the source bitmap.

5. The method of claim 1 wherein said step of generating a row of pixel information for a destination row using pixel information from a source row includes the steps of:

storing a pixel value associated with a first pixel in said source row to a first location of said buffer;

updating the value of a row error term;

storing a pixel value associated with either the first pixel or a next pixel in said source row to the next location of said buffer responsive to the value of said row error term; and repeating said steps of updating and storing until a row of pixel information for a destination row is complete.

6. The method of claim 5 wherein said step of updating said row error term includes the step of reducing said row error term by a predetermined amount.

7. The method of claim 6 wherein said step of reducing said row error term by a predetermined amount further includes the step of reducing said row error term by a value dependent upon the dimension of a row of the source bitmap.

8. A computer system comprising:

a video controller;

a display coupled to said video controller; and control circuitry for:

generating a row of pixel information for a destination row using pixel information from a source row;

storing said row of pixel information for the destination row in a buffer;

transferring said row of pixel information for the destination row from said buffer to a memory at locations corresponding to multiple destination rows of a destination bitmap, wherein a column error term is updated by a value dependent upon the dimension of a column of the source bitmap; and repeating said steps of generating, storing, and transferring until the destination bitmap is complete.

9. The computer system of claim 8 wherein said control circuitry transfers a row of pixel information by:

moving said row of pixel information for the destination row from said buffer to the memory at addresses corresponding to a row of the destination bitmap; and repeating said moving step until said column error term is within a predetermined criteria.

10. The computer system of claim 9 wherein said control circuitry updates the value of said column error term by reducing said column error term by a predetermined amount.

11. The computer system of claim 10 wherein said control circuitry updates the value of said column error term by reducing said column error term by a value dependent upon the dimension of a column of the source bitmap.

12. The computer system of claim 8 wherein said control circuitry generates said row of pixel information for a destination row using pixel information from a source row by:

storing a pixel value associated with a first pixel in said source row to a first location of said buffer;

updating the value of a row error term;

storing a pixel value associated with either the first pixel or a next pixel in said source row to the next location of said buffer responsive to the value of said row error term; and repeating said steps of updating and storing until a row of pixel information for a destination row is complete.

13. The computer system of claim 12 wherein said control circuitry updates the value of said row error term by reducing said row error term by a predetermined amount.

14. The computer system of claim 13 wherein said control circuitry updates the value of said row error term by reducing said row error term by a value dependent upon the dimension of a row of the source bitmap.

15. A method of stretching a source bitmap having known row and column dimensions to a destination bitmap having row and column dimensions greater than the source bitmap comprising the steps of:

generating a row of pixel information for a destination row using pixel information from a source row, wherein a row error term is updated with a value dependant upon the row dimension of the source bitmap;

storing said row of pixel information for the destination row in a buffer;

transferring said stored row of pixel information for the destination row from said buffer to a memory at locations corresponding to multiple destination rows of the destination bitmap; and repeating said steps of generating, storing, and transferring until the destination bitmap is complete.

16. The method of claim 15 wherein said transferring step comprises the steps of:

moving said stored row of pixel information for the destination row from said buffer to said memory at addresses corresponding to a row of the destination bitmap;

updating the value of a column error term; and repeating said moving and updating steps until said column error term is within a predetermined criteria.

17. The method of claim 16 wherein said updating step further includes the step of reducing said column error term by a predetermined amount.

18. The method of claim 17 wherein said updating step further includes the step of reducing said column error term by a value dependent upon the dimension of a column of the source bitmap.

19. The method of claim 15 wherein said generating step further includes the steps of:

storing a pixel value associated with a first pixel in said source row to a first location of said buffer;

storing a pixel value associated with either the first pixel or a next pixel in said source row to the next location of said buffer responsive to the value of said row error term; and repeating said storing steps until a row of pixel information for a destination row is complete.

20. The method of claim 19 wherein said generating step includes the step of reducing said row error term by a predetermined amount.

21. The method of claim 20 wherein said step of reducing said row error term by a predetermined amount further includes the step of reducing said row error term by a value dependent upon the dimension of a row of the source bitmap.

22. A computer system comprising:

a video controller;

a display coupled to said video controller; and control circuitry for:

generating a row of pixel information for a destination row using pixel information from a source row, wherein a row error term is updated with a value dependant upon the row dimension of the source bitmap;

storing said row of pixel information for the destination row in a buffer;

transferring said row of pixel information for the destination row from said buffer to a memory at locations corresponding to multiple destination rows of a destination bitmap; and repeating said steps of generating, storing, and transferring until the destination bitmap is complete.

23. The computer system of claim 22 wherein said control circuitry transfers a row of pixel information by:

moving said row of pixel information for the destination row from said buffer to the memory at addresses corresponding to a row of the destination bitmap; and repeating said moving step until said column error term is within a predetermined criteria.

24. The computer system of claim 23 wherein said control circuitry updates the value of said column error term by reducing said column error term by a predetermined amount.

25. The computer system of claim 24 wherein said control circuitry updates the value of said column error term by reducing said column error term by a value dependent upon the dimension of a column of the source bitmap.

26. The computer system of claim 22 wherein said control circuitry generates said row of pixel information for a destination row using pixel information from a source row by:

storing a pixel value associated with a first pixel in said source row to a first location of said buffer;

storing a pixel value associated with either the first pixel or a next pixel in said source row to the next location of said buffer responsive to the value of said row error term; and repeating said storing steps until a row of pixel information for a destination row is complete.

27. The computer system of claim 26 wherein said control circuitry updates the value of said row error term by reducing said row error term by a predetermined amount.

28. The computer system of claim 27 wherein said control circuitry updates the value of said row error term by reducing said row error term by a value dependent upon the dimension of a row of the source bitmap.

* * * * *